United States Patent
Yoshida et al.

(10) Patent No.: US 7,477,466 B2
(45) Date of Patent: Jan. 13, 2009

(54) CONTROL DEVICE AND STORAGE DEVICE

(75) Inventors: Osamu Yoshida, Kawasaki (JP);
Shunsuke Aoki, Kawasaki (JP);
Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 11/589,401

(22) Filed: Oct. 30, 2006

(65) Prior Publication Data

US 2007/0291389 A1    Dec. 20, 2007

(30) Foreign Application Priority Data

Jun. 15, 2006    (JP)    .............................. 2006-166612

(51) Int. Cl.
*G11B 27/36*    (2006.01)
(52) U.S. Cl. ....................................................... 360/31
(58) Field of Classification Search .................. 360/31, 360/75, 46
See application file for complete search history.

(56) References Cited

U.S. PATENT DOCUMENTS 5,831,781 A    11/1998  Okamura
6,671,110 B2*  12/2003  Baba et al. ..................... 360/31
7,271,975 B2*   9/2007  Shimizu et al. ............... 360/75

FOREIGN PATENT DOCUMENTS

| JP | 07-057376  | 3/1995 |
| JP | 9-139040   | 5/1997 |
| JP | 2004-342168 | 12/2004 |

* cited by examiner

*Primary Examiner*—Fred Tzeng
(74) *Attorney, Agent, or Firm*—Greer, Burns & Crain, Ltd.

(57) ABSTRACT

A control device that controls a storage device having an auto-gain-control function for controlling strength of an output signal from a head that reads data from a storage medium, which includes a determining unit that determines whether the strength of the output signal controlled by the auto-gain-control function is within a predetermined range, an abnormal-float detecting unit that detects an abnormal float of the head based on a result from the determining unit, an abnormal-float-number counting unit that counts a number of times of the detected abnormal floats of the head, and an abnormal-float-count storing unit that stores the counted number of times of the abnormal floats into a storage area of the storage device.

19 Claims, 7 Drawing Sheets

| OFFSET | CONTENTS OF DATA |
|---|---|
| 0 | MEASUREMENT PERIOD SECTION |
| 1 | MEASUREMENT ZONE |
| 2 | NUMBER OF TIMES OF ABNORMAL FLOATS OF HEAD |

FIG.5

| OFFSET | CONTENTS OF DATA |
|---|---|
| 0 | AGC REFERENCE VALUE |
| 1 | PREDETERMINED THRESHOLD VALUE |

FIG.6

| OFFSET | CONTENTS OF DATA |
|---|---|
| 0 | ACCUMULATED NUMBER OF TIMES OF ABNORMAL FLOATS OF HEAD |
| 1 | NUMBER OF TIMES OF ABNORMAL FLOATS OF HEAD DURING MEASUREMENT PERIOD SECTION A |
| 2 | NUMBER OF TIMES OF ABNORMAL FLOATS OF HEAD DURING MEASUREMENT PERIOD SECTION B |
| 3 | NUMBER OF TIMES OF ABNORMAL FLOATS OF HEAD DURING MEASUREMENT PERIOD SECTION C |
| 4 | NUMBER OF TIMES OF ABNORMAL FLOATS OF HEAD DURING MEASUREMENT PERIOD SECTION D |

| OFFSET | CONTENTS OF DATA |
|---|---|
| 0 | MEASUREMENT PERIOD SECTION |
| 1 | MEASUREMENT ZONE |
| 2 | NUMBER OF TIMES OF ABNORMAL FLOATS OF HEAD |
| 3 | NUMBER OF TIMES OF SHOCKS DETECTED |

CONTROL DEVICE AND STORAGE DEVICE

BACKGROUND OF THE INVENTION

1. Field of the Invention

The present invention relates to a technology for determining an occurrence of a failure related to a head in a magnetic disk device that includes an automatic amplifying adjustment function.

2. Description of the Related Art

Various techniques are know for preventing destruction or loss of data stored in the storage devices such as a magnetic disk device. For example, Japanese Patent Application Laid-open No. H9-139040 discloses a technology for preventing destruction or loss of data in the storage devices by assuring an operation to be properly performed for writing and reading of data to and from the storage devices.

Figure 11:
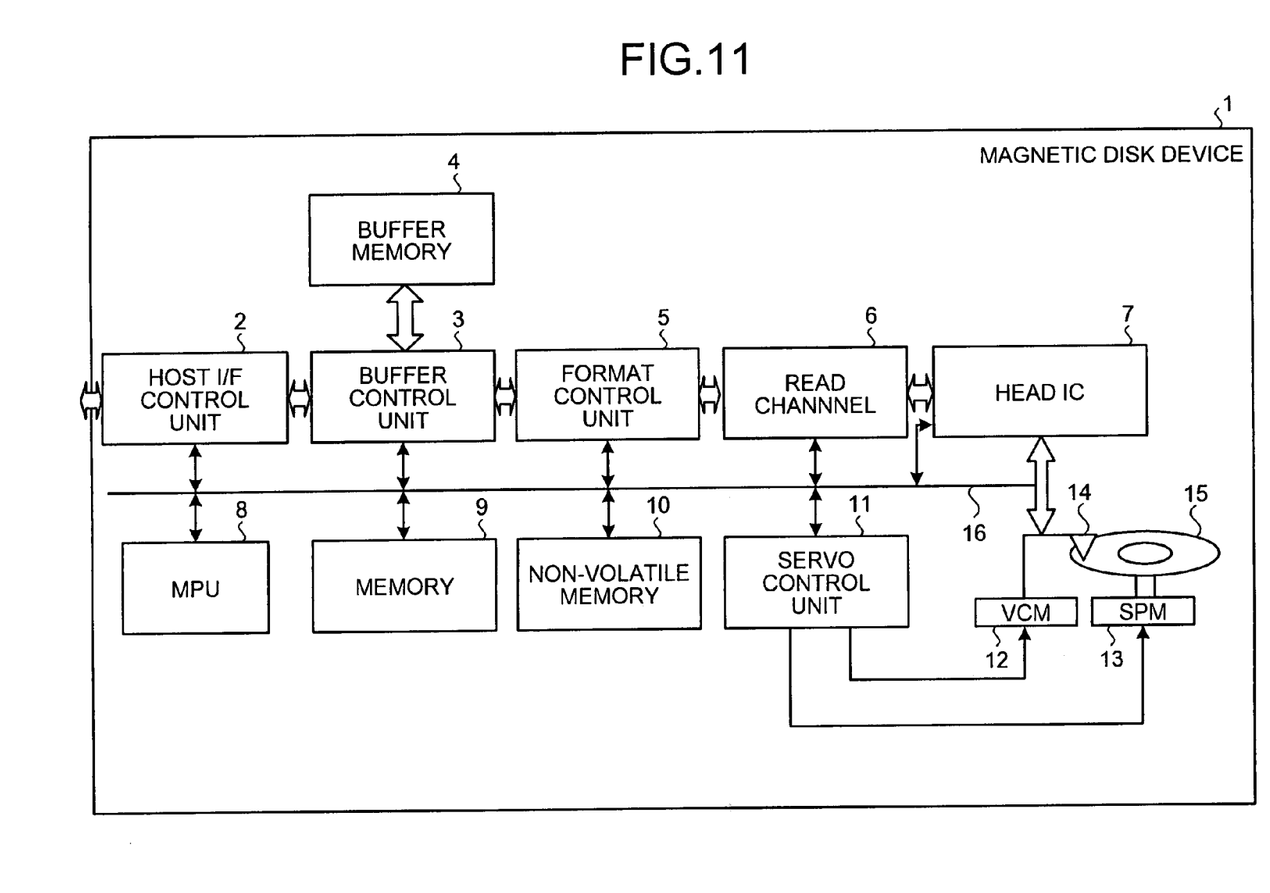
FIG. 11 is a diagram for explaining a conventional magnetic disk device.
Figure 12:
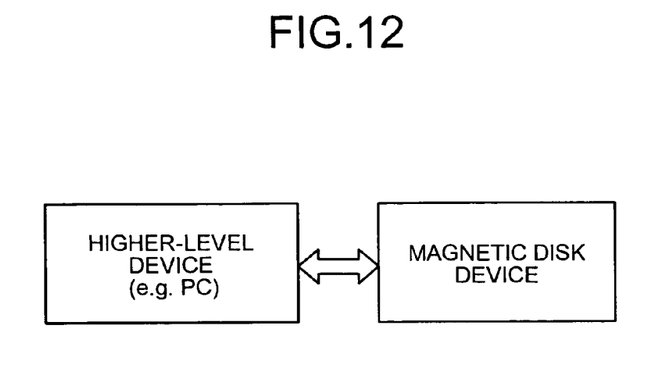
FIG. 12 is a schematic for explaining the conventional magnetic disk device.
Figure 13:
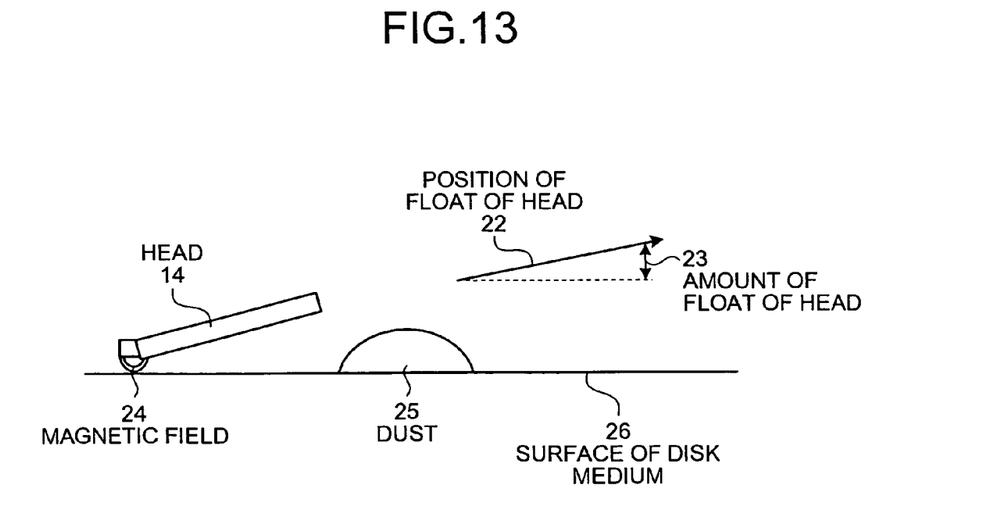
FIG. 13 is a schematic for explaining the conventional magnetic disk device.

According to the conventional techniques, as shown in FIG. 13, when a magnetic disk device 1 (see, FIG. 11 and FIG. 12), which has been connected to a higher-level device via a host interface or the like, is performing a data writing processing, if a head 14 of the magnetic disk device 1 comes in contact with dust 25 on a surface 26 of a disk medium 15, the head 14 temporarily floats abnormally due to a shock from the contact and moves to a position described with a reference numeral 22. Accordingly, an extra distance shown with reference numeral 23 is generated between the head 14 and the surface 26 of the disk medium 15, and there causes a problem that data cannot be written onto the disk medium 15 because a magnetic field 24 of the head 14 cannot reach the surface 26 of the disk medium 15 so that a weak signal is output from the head 14. When a weak signal is output from the head 14, the processing is terminated to prevent the data destruction, and a new attempt is made to perform the data writing processing.

According to the conventional techniques, floating of the head can be detected only after the occurrence of the floating. Thus, there is a need of a technology that can predict occurrence of the floating of the head.

SUMMARY OF THE INVENTION

It is an object of the present invention to at least partially solve the problems in the conventional technology.

According to an aspect of the present invention, a control device that controls a storage device having an auto-gain-control function for controlling strength of an output signal from a head that reads data from a storage medium includes a determining unit that determines whether the strength of the output signal controlled by the auto-gain-control function is within a predetermined range, a detecting unit that detects an abnormal float of the head based on a determination made by the determining unit, a counting unit that counts a number of times the detecting unit detects abnormal float of the head, and a storing unit that stores the number of times of the abnormal floats counted by the counting unit into a storage area of the storage device.

According to another aspect of the present invention, a storage device having an auto-gain-control function for controlling strength of an output signal from a head that reads data from a storage medium includes a determining unit that determines whether the strength of the output signal controlled by the auto-gain-control function is within a predetermined range, a detecting unit that detects an abnormal float of the head based on determination made by the determining unit, a counting unit that counts a number of times the detecting unit detects abnormal float of the head, and a storing unit that stores therein the number of times of the abnormal floats counted by the counting unit into a storage area of the storage device.

According to still another aspect of the present invention, a control method for controlling a storage device having an auto-gain-control function for controlling strength of an output signal from a head that reads data from a storage medium includes determining whether the strength of the output signal controlled by the auto-gain-control function is within a predetermined range, detecting an abnormal float of the head based on a determination made at the determining, counting a number of times of the abnormal floats of the head detected at the detecting, and storing the number of times of the abnormal floats counted at the counting into a storage area of the storage device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail, with reference to the accompanying drawings.

Figure 1:
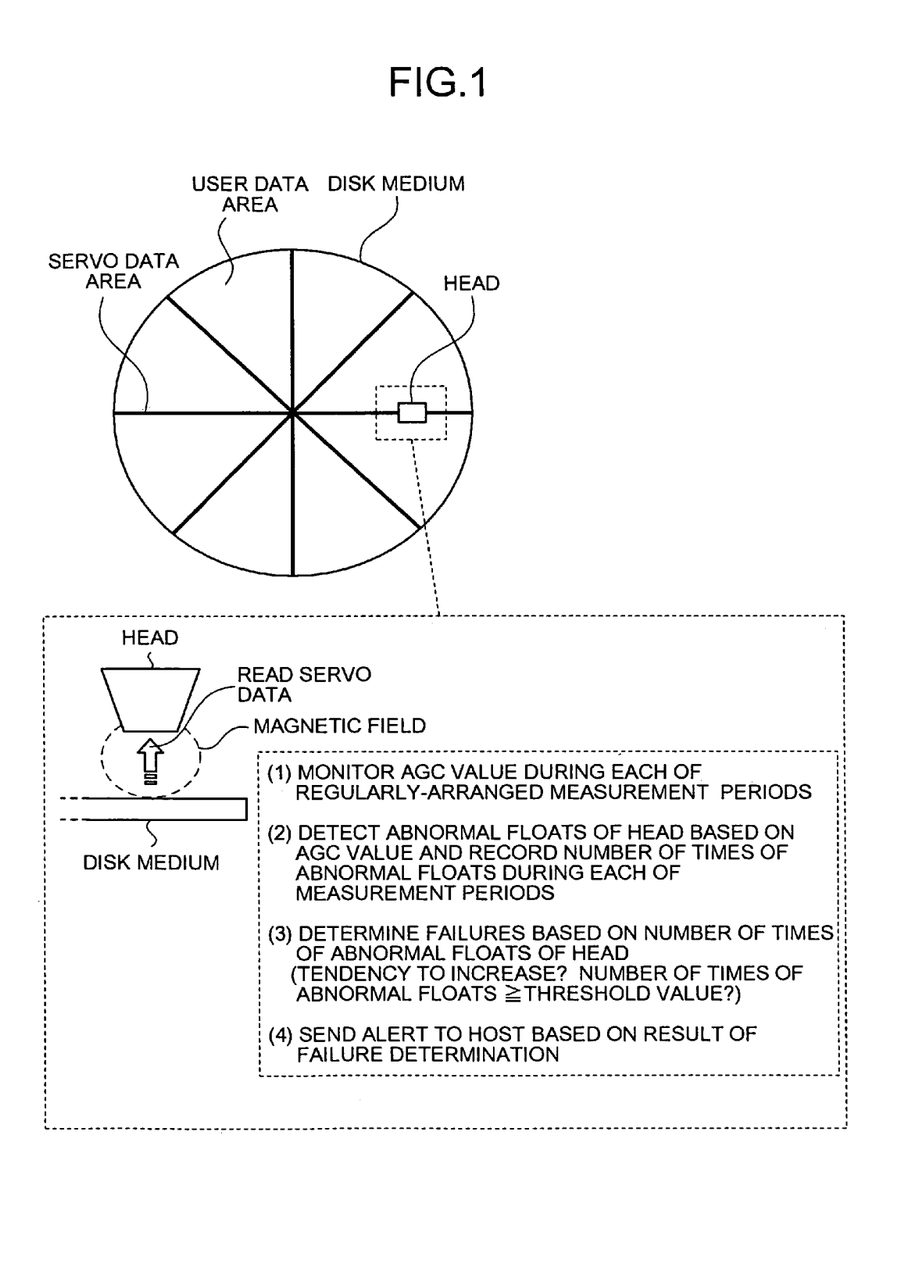
FIG. 1 is a schematic for explaining an overview and characteristics of a magnetic disk device according to a first embodiment of the present invention.

FIG. 1 is a schematic for explaining an overview and characteristics of a magnetic disk device according to a first embodiment of the present invention. The magnetic disk device according to the first embodiment has a function called Auto Gain Control (AGC) for controlling strength of an output signal from a read unit (i.e., a magneto-resistive (MR)

element) included in a head (also called "a head slider") that reads data from a storage medium. For example, the magnetic disk device according to the first embodiment monitors floats of the head, and particularly, the magnetic disk device according to the first embodiment determines and avoids a failure caused by dust or the like adhering to the surface of the disk medium in the magnetic disk device. The failure is, for example, breakage of the head due to collision between the head and dust caused by breakage of the disk medium.

More specifically, the magnetic disk device according to the first embodiment specifies in advance and stores an AGC value that is obtained at an initial state (i.e., the state in which the reading or the writing of data can be performed properly), as an AGC reference value. The AGC is an adjustment mechanism that automatically amplifies a signal output from the read unit, when servo data is read from the disk medium. For example, when the head floats overly away from the disk medium, the action of a magnetic field generated at a tip of the head to affect the disk medium is weakened, and therefore, the weakened output signal from the head is automatically amplified.

The magnetic disk device according to the first embodiment monitors the AGC value in a measurement zone provided on the disk medium, during each of measurement periods, which are arranged so that the number of times of abnormal floats of the head can be regularly measured (see, (1) of FIG. 1). The abnormal floats of the head are detected based on the AGC value, and the number of times of the abnormal floats detected during each measurement period is recorded (see, (2) of FIG. 1). Because the abnormal floats of the head are detected based on the AGC value, it is possible to determine and avoid failures caused by dust or the like adhering to the surface of the disk medium in the magnetic disk device according to the first embodiment, using a mechanism that is already included in the magnetic disk device, without having to put a special mechanism into the magnetic disk device.

With the magnetic disk device according to the first embodiment, for example, when a head 14 collides with dust adhering to the surface of a disk medium 15, the distance between the head 14 and the disk medium 15 becomes larger (i.e., the head 14 floats abnormally), and the signal output from the head 14 is automatically amplified through the AGC function. Accordingly, when the AGC value obtained in a measurement process is larger than the AGC reference value, it is considered that the head is having an abnormal float, and the abnormal float is thus detected.

Subsequently, the magnetic disk device according to the first embodiment temporarily records, into a memory or the like, a value representing one of specified measurement-period-sections, an abnormal float measurement zone on the disk medium, and the number of times of the abnormal floats of the head that have been detected during the measurement process. The value that represents one of the specified measurement-period-sections is, for example, a measurement start time determined by an accumulated power-on period that is timed from when the magnetic disk device is shipped from a manufacturing location, or an integer value obtained through an appropriate conversion to represent the measurement start time. Thereafter, the magnetic disk device according to the first embodiment records the same information into a system area or the like on the disk medium.

Further, the magnetic disk device according to the first embodiment determines failures, at appropriate timing, based on the number of times of the abnormal floats that has been recorded (see, (3) of FIG. 1). For example, a measurement process of measuring floats can be performed only in one zone during each of the measurement periods. In such a situation, the magnetic disk device according to the first embodiment can perform an operation of determining failures after the measurement process in all zones is finished.

More specifically, for example, if the number of times of the abnormal floats increases every time the measurement process is performed, or if the accumulated number of times of the abnormal floats exceeds a predetermined threshold value, the magnetic disk device according to the first embodiment determines that there is a high possibility of an occurrence of a failure caused by dust adhering to the surface of the disk medium or the like. When the magnetic disk device according to the first embodiment determines that there is a high possibility of an occurrence of a failure caused by the dust adhering to the surface of the disk medium or the like, the magnetic disk device sends an alert to a host based on the determination.

With the arrangements, the magnetic disk device according to the first embodiment can determine and avoid failures caused by dust adhering to the surface of the disk medium or the like in the magnetic disk device.

Figure 2:
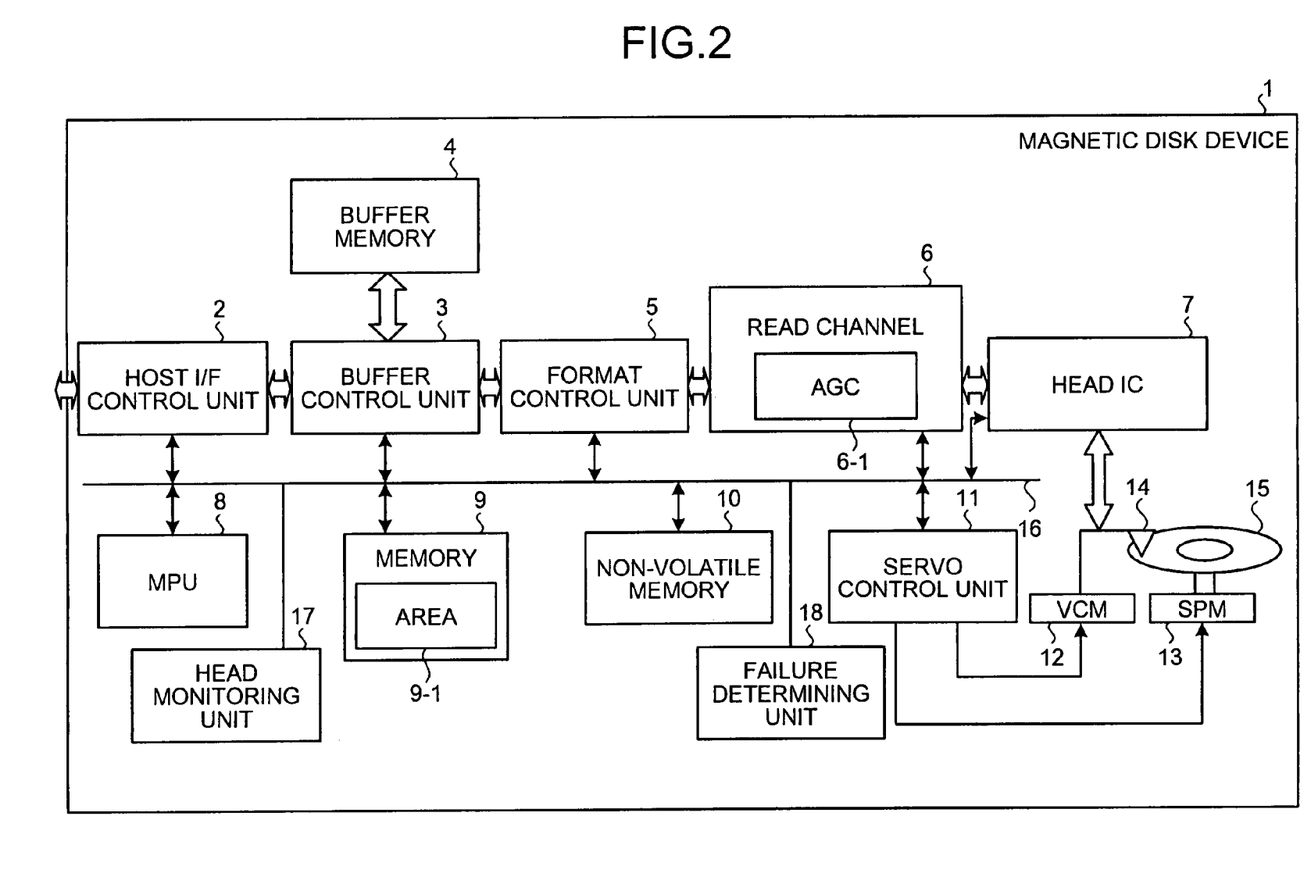
FIG. 2 is a block diagram of the magnetic disk device according to the first embodiment.

FIG. 2 is a block diagram of a magnetic disk device 1. The magnetic disk device 1 includes a host interface (I/F) control unit 2 that controls communication related to various types of information given to and received from the host; a buffer control unit 3 that controls a buffer memory 4; the buffer memory 4 that temporarily stores information and the like given to and received from the host via the host I/F control unit 2; a format control unit 5 that controls the reading and the writing of data by performing an error check of Non Return to Zero (NRZ) data (i.e., digital data) that is received from a read channel 6 when data is read; the read channel 6 that includes an AGC function 6-1, which is an adjustment mechanism that automatically amplifies a signal read from the head 14 and input from a head integrated circuit (IC) 7 when servo data is read from the disk medium; the head IC 7; a Micro Processing Unit (MPU) 8 that exercises the main control of the magnetic disk device 1; a memory 9 and a non-volatile memory 10 that store data and programs used for controlling the magnetic disk device 1; a servo control unit 11 that controls the operation of a voice coil motor (VCM) 12 and a spindle motor (SPM) 13; the VCM 12; the SPM 13; the head 14; the disk medium 15; a common bus 16; a head monitoring unit 17; and a failure determining unit 18. Among the components, the MPU 8, the memory 9, the disk medium 15, the head monitoring unit 17, and the failure determining unit 18 are closely related to the present invention.

The MPU 8 is a control unit that exercises the main control of the magnetic disk device 1 using a predetermined control program (i.e., a firmware program). More specifically, the MPU 8 exercises control, for example, to send an alert to the host, based on a result of a failure determination process performed by the failure determining unit 18.

Figure 4:
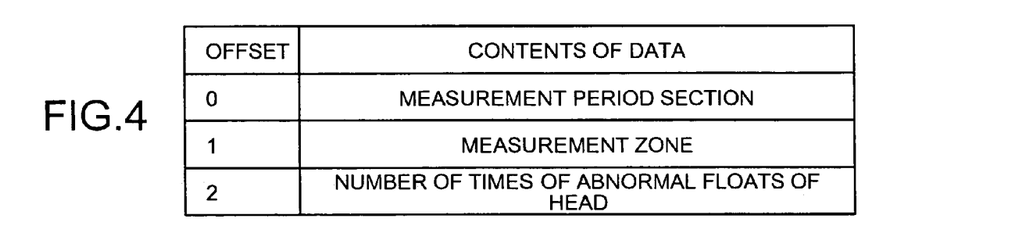
FIG. 4 is an example of measurement data recorded in a memory according to the first embodiment.

The memory 9 records data and programs that are used for controlling the magnetic disk device 1 and that are necessary in various types of processing performed by the magnetic disk device 1. More specifically, as shown in FIG. 4, the memory 9 temporarily records, into an area 9-1, one of the measurement-period-sections specified for measuring the number of times of the abnormal floats of the head 14 (for example, a measurement start time determined by an accumulated power-on period that is timed from when the magnetic disk device 1 is shipped from a manufacturing location or an integer value obtained through an appropriate conversion to represent the measurement start time), an abnormal float measurement zone on the disk medium 15, and the number of times of the abnormal floats of the head 14 that have been counted during the measurement period.

Figure 3:
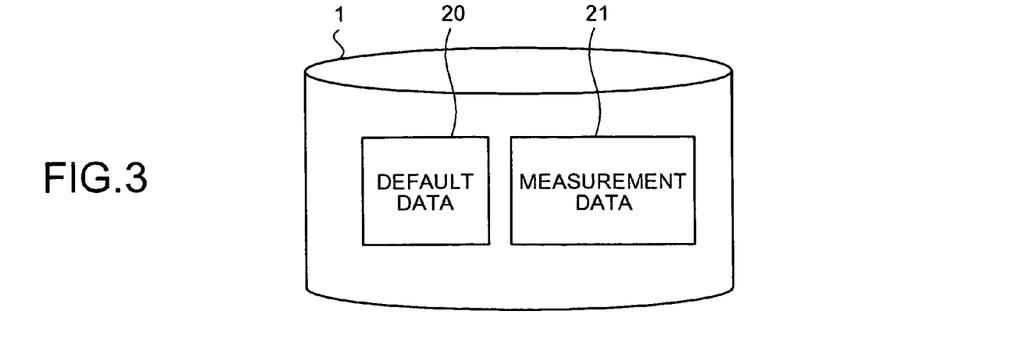
FIG. 3 is an example of data recorded on a disk medium according to the first embodiment.
Figure 5:
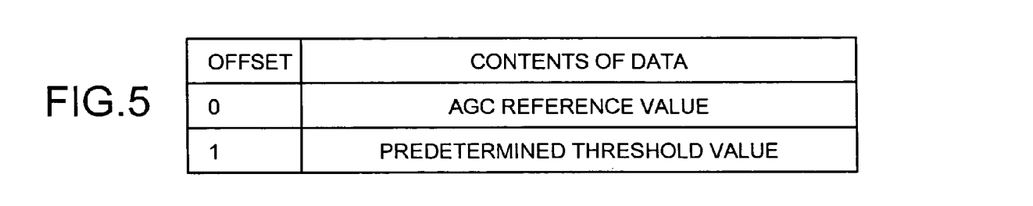
FIG. 5 is an example of default data recorded on the disk medium according to the first embodiment.

The disk medium 15 records various types of user data and system data. Further, as shown in FIG. 3, the disk medium 15 records default data 20 and measurement data 21 in a system area used for recording the system data. More specifically, as shown in FIG. 5, the AGC reference value (i.e., an AGC value obtained at the initial state in which the reading or the writing of data can be properly performed) and the threshold value for the number of times of the abnormal floats used for determining failures are recorded in the area in which the default data 20 is recorded.

Figure 6:
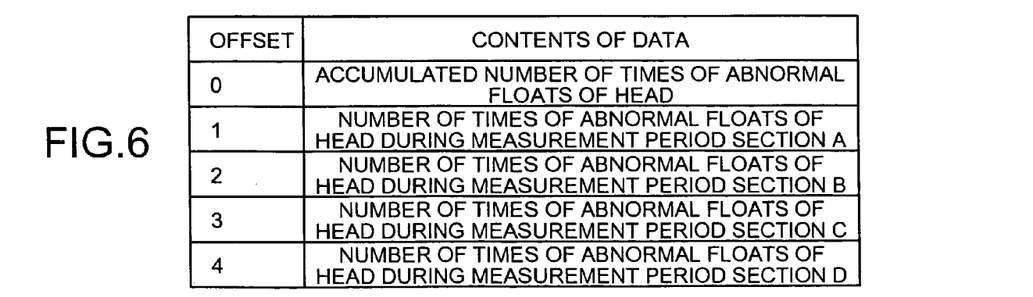
FIG. 6 is an example of measurement data recorded on the disk medium according to the first embodiment.

In the area in which the measurement data 21 is recorded, as shown in FIG. 6, the accumulated number of times of the abnormal floats of the head 14 and the number of times of the abnormal floats in each of the measurement period sections (for example, sections "A", "B", "C", and "D" in the chronological order) that are arranged so that the number of abnormal floats can be regularly measured. As for the measurement period sections "A", "B", "C", and "D", for example, the measurement period section "D" represents a current measurement period, the measurement period section "C" represents a measurement period that immediately precedes "D", the measurement period section "B" represents a measurement period that immediately precedes "C", and the measurement period section "A" represents a measurement period that immediately precedes "B". Because disk devices generally have a function for measuring a total power-on period that is timed from when the device is shipped from a manufacturing location, the total power-on period can be used as a clock for determining the timing at which the measurement process is performed.

The head monitoring unit 17 is configured as one of program modules in the firmware program used by the MPU 8. During each measurement period in which the number of times of the abnormal floats of the head 14 is measured, the head monitoring unit 17 monitors the value of the AGC 6-1 included in the read channel 6 for a measurement zone provided on the disk medium 15 and detects an abnormal float of the head 14 based on the AGC value.

More specifically, if the AGC value obtained during a measurement process is larger than the AGC reference value (for example, when the head 14 collides with dust adhering to the surface of the disk medium 15, and a signal output from the head 14 is automatically amplified through the AGC function because the distance between the head 14 and the disk medium 15 becomes larger), the head monitoring unit 17 detects the abnormal float of the head 14. Thereafter, the head monitoring unit 17 temporarily records, into the area 9-1 in the memory 9 or the like, measurement data that includes the measurement period sections (i.e., a value for identifying a measurement period in which the measurement process is performed, being timed from when the magnetic disk device 1 is shipped from the manufacturing location; see, FIG. 6), the abnormal float measurement zone on the disk medium 15, and the number of times of the abnormal floats of the head 14 detected during the measurement process. Eventually, the head monitoring unit 17 records the measurement data into the system area on the disk medium 15.

The detection process for detecting the abnormal floats of the head 14 is performed in each of the measurement-period-sections that are arranged regularly, so that failures caused by the dust adhering to the surface of the disk medium 15 or the like can be determined in detail, and the failures can be avoided, by determining whether the number of times of the abnormal floats of the head 14 is increasing.

Figure 7:
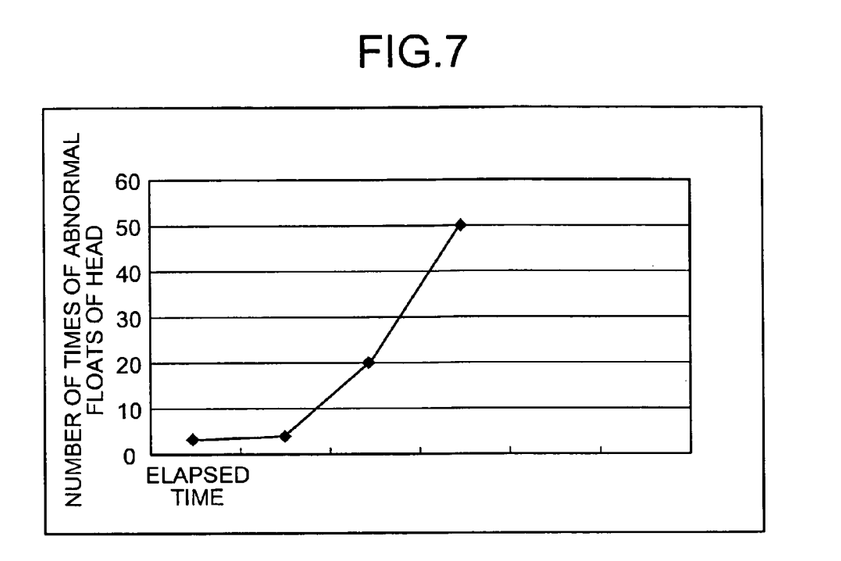
FIG. 7 is a graph for explaining a change in the number of times of abnormal floats of a head according to the first embodiment.

The failure determining unit 18 is configured as one of the program modules in the firmware program used by the MPU 8. The failure determining unit 18 determines failures, at an appropriate timing (for example, after the measurement processes in all measurement zones are finished through the regularly-performed measurement processes), based on the recorded number of times of the abnormal floats. More specifically, as shown in FIG. 7, a graph that shows a relation between the measurement period sections timed from the shipping and the number of times of the abnormal floats is generated based on the measurement data stored in the memory 9. If the number of times of the abnormal floats increases every time the measurement process is performed (i.e., when the slope of the graph upwards as the time passes), or if the accumulated number of times of the abnormal floats exceeds a predetermined threshold value, the failure determining unit 18 determines that there is a high possibility of an occurrence of a failure caused by dust adhering to the surface of the disk medium 15 or the like. Further, the failure determining unit 18 performs a determination based on a result of the failure determination. For example, the failure determining unit 18 determines a necessity of sending an alert to the host, when it is determined that there is a high possibility of an occurrence of a failure. Thereafter, the failure determining unit 18 sends an alert to the host based on the determination such that there is a high possibility of having a failure in the magnetic disk device 1.

Figure 8:
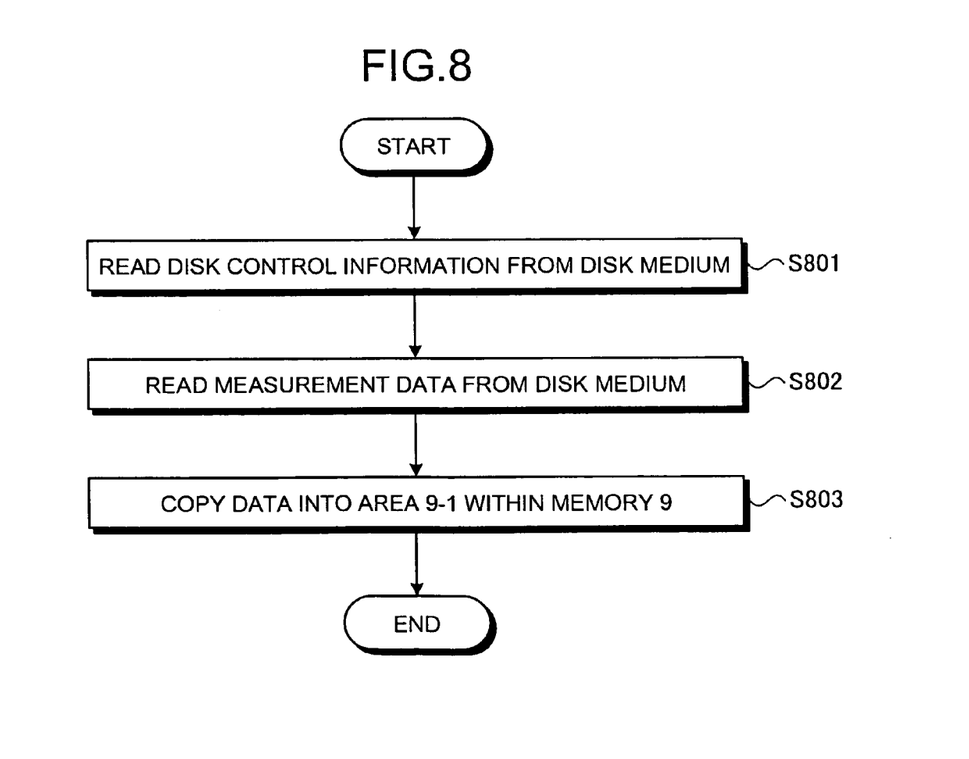
FIG. 8 is a flowchart of a processing procedure performed by the magnetic disk device according to the first embodiment.

FIG. 8 is a flowchart of a processing procedure performed by the magnetic disk device 1, when the power is turned on. As shown in FIG. 8, the MPU 8 included in the magnetic disk device 1 reads pieces of control information from the disk medium 15 through the firmware program (step S801) and stores the read control information into the memory 9. Subsequently, the MPU 8 reads measurement data from the disk medium 15 (step S802) and stores the read measurement data into the area 9-1 in the memory 9 (step S803).

It is also possible to store a result of a self-diagnostic test into the non-volatile memory 10 and therefore omit the processing of storing the measurement data.

Figure 9:
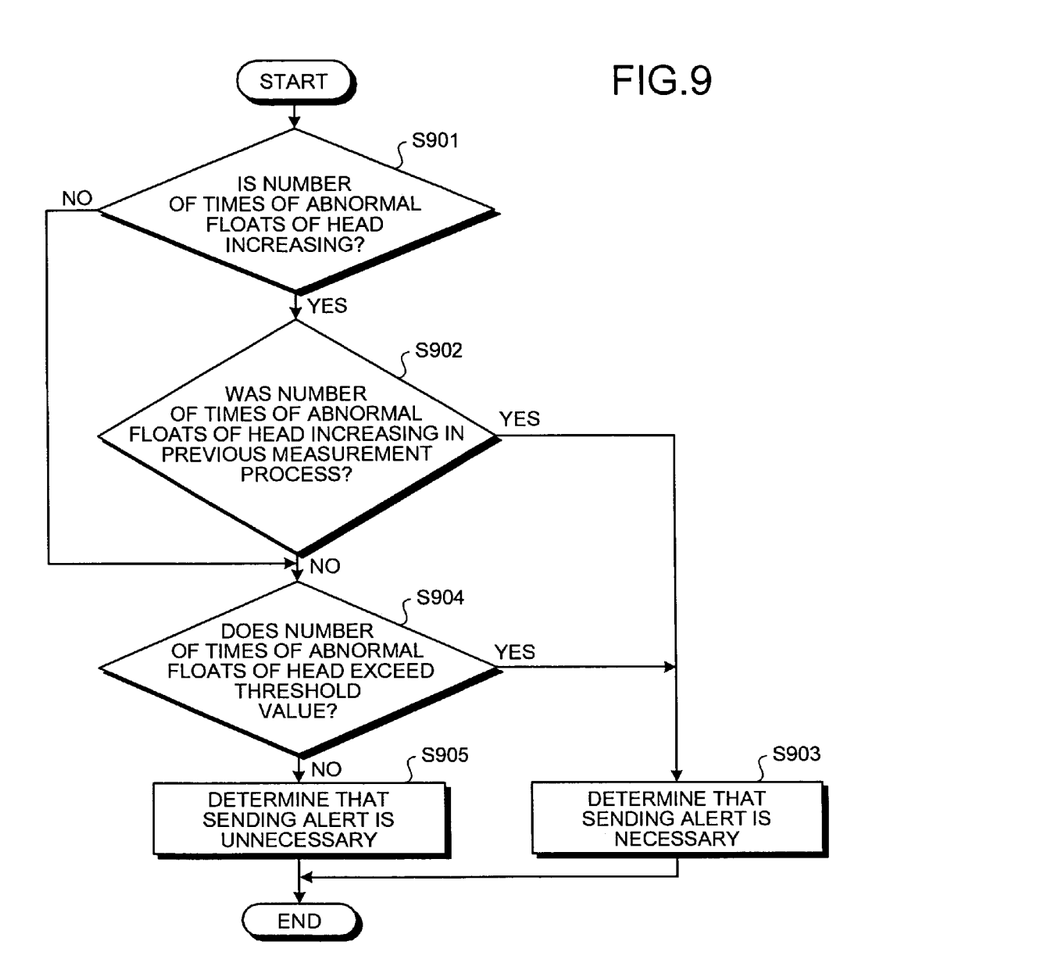
FIG. 9 is a flowchart of a processing procedure performed by the magnetic disk device according to the first embodiment.

FIG. 9 is a flowchart of a processing procedure performed by the magnetic disk device 1 for detecting abnormal floats. As shown in FIG. 9, the magnetic disk device 1 starts the failure determination process, at an appropriate timing (for example, when N times of the regularly-performed measurement processes are finished), based on the recorded number of times of the abnormal floats.

Subsequently, the failure determining unit 18, which is configured as one of the program modules in the firmware program according to the first embodiment, generates a graph, for example, that shows a relation between the measurement period sections and the number of times of the abnormal floats, based on the measurement data stored in the memory 9. The failure determining unit 18 checks whether the number of times of the abnormal floats of the head 14 is increasing (step S901). When the number of times of the abnormal floats of the head 14 is increasing (Yes at step S901), the magnetic disk device 1 checks whether the number of times of the abnormal floats of the head 14 was also increasing in the previous measurement process (step S902). When the number of times of the abnormal floats of the head 14 was increasing in the previous measurement process (Yes at step S902), the failure determining unit 18 determines that there is a high possibility of an occurrence of a failure. Accordingly, the MPU 8 determines that it is necessary to send an alert to the host (step S903).

On the other hand, when the number of times of the abnormal floats of the head 14 was not increasing in the previous measurement process (No at step S902), the failure determining unit 18 checks whether the number of times (i.e., an accumulated number of times) of the abnormal floats of the head 14 exceeds the threshold value (step S904). When the number of times of the abnormal floats of the head 14 exceeds the threshold value (Yes at step S904), the failure determining unit 18 determines that there is a high possibility of an occurrence of a failure, and the MPU 8 determines that it is necessary to send an alert to the host (step S903). On the contrary, when the number of times of the abnormal floats of the head 14 does not exceed the threshold value (No at step S904), the MPU 8 determines that it is not necessary to send an alert to the host (step S905).

Referring back to an explanation of step S901, when the number of times of the abnormal floats of the head 14 is not increasing (No at step S901), the failure determining unit 18 checks whether the number of times of the abnormal floats of the head 14' exceeds the threshold value (step S904). When the number of times of the abnormal floats of the head 14 exceeds the threshold value (Yes at step S904), the failure determining unit 18 determines that there is a high possibility of an occurrence of a failure. Accordingly, the MPU 8 determines that it is necessary to send an alert to the host (step S903). On the contrary, when the number of times of the abnormal floats of the head 14 does not exceed the threshold value (No at step S904), the MPU 8 determines that it is not necessary to send an alert to the host (step S905).

As explained above, according to the first embodiment of the present invention, the abnormal floats of the head can be detected based on a determination whether the output strength of an AGC signal, which is controlled by an adjustment mechanism called Auto Gain Control (AGC) that automatically amplifies the signal from the head, when servo data is read from a predetermined storage medium (e.g., a magnetic disk medium), is within a predetermined range. The predetermined range can be determined through, for example, the amplification ratio obtained in a state in which the reading and the writing of data can be performed properly. Further, because the number of times of the abnormal floats is counted and stored, it is possible to obtain data used for determining whether the head is being damaged by dust adhering to the surface of the disk medium. As a result, it is possible to determine and avoid a failure (i.e., the head being damaged due to collision between the head and the dust caused by a damage of the disk medium), caused by the dust adhering to the surface of the disk medium or the like, in the storage device.

According to the first embodiment of the present invention, the abnormal floats of the head are regularly checked at a predetermined timing, for example, once in a predetermined period of time. Thus, it is possible to properly determine and avoid as much as possible, failures caused by dust adhering to the surface of the disk medium or the like, in the magnetic disk device while the processing load is kept small.

Further, according to the first embodiment of the present invention, it can be determined whether there is a possibility of an occurrence of a failure with the head, based on the number of times of the abnormal floats of the head. Thus, it is possible to determine that there is a high possibility of an occurrence of a failure caused by the dust adhering to the surface of the disk medium or the like, in the magnetic disk device, when, for example, the number of times of the abnormal floats of the head counted for each section of period increases, or when the number of times of the abnormal floats of the head exceeds the predetermined threshold value.

Furthermore, according to the first embodiment of the present invention, when it is determined that there is a possibility of an occurrence of a failure with the head, an alert is sent to a higher-level device. Accordingly, the higher-level device can determine that there is a possibility of an occurrence of a failure caused by dust adhering to the surface of the disk medium or the like, in the magnetic disk device. As a result, reliability of the magnetic disk device can be improved.

Exemplary embodiments of the present invention have been explained above. However, the present invention can be embodied in various forms other than the exemplary embodiments described above. A second embodiment of the present invention will be explained below as an example of other exemplary embodiments.

(1) Detecting Shocks and Deleting the Number of Detected Shocks from the Number of Times of Abnormal Floats.

Figure 10:
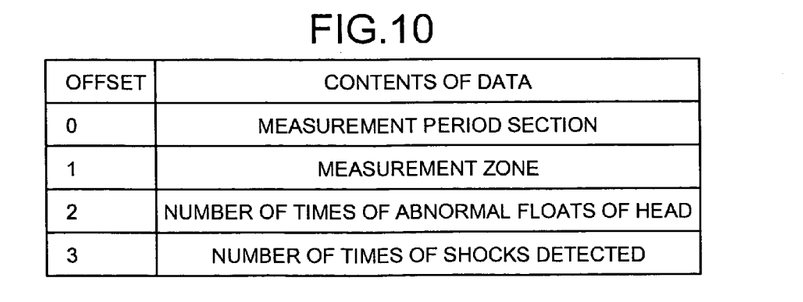
FIG. 10 is an example of measurement data recorded in a memory according to a second embodiment.

A configuration can be such that, as shown in FIG. 10, in addition to the first embodiment described above, shocks applied from sources outside the magnetic disk device are detected, the number of times of the applied shocks is recorded into a memory or the like, and a value (i.e. the number of times) obtained by subtracting the number of times of the shocks from the counted number of times of the abnormal floats is recorded as the data representing the number of times of the abnormal floats.

With the arrangement, because floats of the head due to the shocks from the outside sources are taken into consideration, it is possible to record an accurate number of times of the abnormal floats. As a result, it is possible to determine with a high precision and to avoid as much as possible, failures caused by dust adhering to the surface of the disk medium or the like.

(2) Detecting Abnormal Floats of the Head in Each of Zones on the Disk Medium.

With the first embodiment, the AGC value is monitored in the predetermined measurement zone provided on the disk medium so that the abnormal floats of the head can be detected based on the AGC value. However, the present invention is not limited to this example. For example, it is acceptable to divide a user area on the disk medium into a plurality of measurement zones based on recording density and to monitor the AGC value in each of the measurement zones so that the abnormal floats of the head can be detected. Alternatively, it is also acceptable to perform the measurement process only in one zone during each of the measurement periods that are regularly arranged.

With the arrangement, it is possible to detect the abnormal floats of the head, with a consideration of floats of the head corresponding to each of the zones on the disk medium having each unique moving speed. Accordingly, it is possible to determine and avoid failures caused by dust adhering to the surface of the entire disk medium or the like.

(3) Detecting the Abnormal Floats of the Head at All Times.

With the first embodiment, it is explained that the abnormal floats of the head are detected regularly. However, the present invention is not limited to the example and the abnormal floats of the head can be detected at all times.

With the arrangement, it is possible to determine and avoid, as much as possible, failures caused by the dust adhering to the surface of the disk medium or the like.

(4) Configuration of the Magnetic Disk Device.

The constituent elements of the magnetic disk device 1 shown in FIG. 2 are based on a functional concept. The magnetic disk device 1 does not necessarily have to be physically configured as shown in the drawings. Further, in the description of the first embodiment, the method in which the invention is realized with the firmware program used by the MPU 8. However, the present invention is not limited to the example and can be configured using any other method. In other words, specific modes of distribution and integration of the magnetic disk device 1 are not limited to the one shown in the drawings. It is acceptable to functionally or physically distribute or integrate a part or all parts of the magnetic disk device 1 in arbitrary units according to various loads and the status of use. For example, the head monitoring unit 17 and the failure determining unit 18 can be integrated together. Further, an arbitrarily-selected part or all of the functions in the various processing performed by the magnetic disk device 1 (e.g. the function in the abnormal float detection processing performed by the head monitoring unit 17 and the function in the failure determination processing performed by the failure determining unit 18) can be realized with an MPU or a program analyzed and executed by the MPU, or alternatively, may be realized as hardware using wired logic.

According to an embodiment of the present invention, it is possible to obtain the data used for determining whether the head is being damaged by dust adhering to the surface of the disk medium. Accordingly, it is possible to determine and avoid a failure (for example, the head being damaged because of collision with the dust caused by a damage of the disk medium), which is caused by dust adhering to the surface of the disk medium or the like, in the storage device. Further, by applying the above functions to a storage device, it is possible to determine, in advance, whether there is a risk that the head in the storage device gets damaged due to the collision between the head and the dust or the like. Thus, a higher-level device or a user of the higher-level device can take necessary countermeasures at appropriate timing to prevent data loss by, for example, replacing the storage device. As a result, damages caused by the data loss can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that controls a storage device having an auto-gain-control function for controlling strength of an output signal from a head that reads data from a storage medium, the control device comprising:
    a determining unit that determines whether the strength of the output signal controlled by the auto-gain-control function is within a predetermined range;
    a detecting unit that detects an abnormal float of the head based on a determination made by the determining unit;
    a counting unit that counts a number of times the detecting unit detects abnormal float of the head; and
    a storing unit that stores the number of times of the abnormal floats counted by the counting unit into a storage area of the storage device.

2. The control device according to claim 1, wherein the detecting unit detects the abnormal float of the head for each of zones on the storage medium.

3. The control device according to claim 1, wherein the detecting unit detects the abnormal float of the head with respect to each predetermined time-period-section and records a plurality of pieces of data of each detection status corresponding to each time-period-section.

4. The control device according to claim 1, wherein the detecting unit detects the abnormal float of the head at all times.

5. The control device according to claim 1, wherein the detecting unit detects the abnormal float of the head regularly.

6. The control device according to claim 1, further comprising:
    a shock detecting unit that detects a shock applied to the storage device from an external source; and
    a shock-number counting unit that counts a number of times the shock detecting unit detects shock to the storage device, wherein
    the storing unit stores a value obtained by subtracting the number of times of the shocks counted by the shock-number counting unit from the number of times of the abnormal floats counted by the counting unit into the storage area.

7. The control device according to claim 1, further comprising a failure determining unit that determines a possibility of an occurrence of a failure of the head based on the number of times of the abnormal floats of the head counted by the counting unit.

8. The control device according to claim 7, wherein the failure determining unit determines the possibility of an occurrence of a failure based on data of detection of the abnormal floats of the head recorded in a chronological sequence.

9. The control device according to claim 7, further comprising an alert sending unit that sends an alert to a higher-level device when the failure determining unit determines that there is a possibility of an occurrence of a failure of the head.

10. A storage device having an auto-gain-control function for controlling strength of an output signal from a head that reads data from a storage medium, the storage device comprising:
    a determining unit that determines whether the strength of the output signal controlled by the auto-gain-control function is within a predetermined range;
    a detecting unit that detects an abnormal float of the head based on determination made by the determining unit;
    a counting unit that counts a number of times the detecting unit detects abnormal float of the head; and
    a storing unit that stores therein the number of times of the abnormal floats counted by the counting unit into a storage area of the storage device.

11. The storage device according to claim 10, wherein the detecting unit detects the abnormal float of the head for each of zones on the storage medium.

12. The storage device according to claim 10, wherein the detecting unit detects the abnormal float of the head with respect to each predetermined time-period-section and records a plurality of pieces of data of each detection status corresponding to each time-period-section.

13. The storage device according to claim 10, wherein the detecting unit detects the abnormal float of the head at all times.

14. The storage device according to claim 10, wherein the detecting unit detects the abnormal float of the head regularly.

15. The storage device according to claim 10, further comprising:
    a shock detecting unit that detects a shock applied to the storage device from an external source; and
    a shock-number counting unit that counts a number of times the shock detecting unit detects shock to the storage device, wherein
    the storing unit stores a value obtained by subtracting the number of times of the shocks counted by the shock-number counting unit from the number of times of the abnormal floats counted by the counting unit of the storage area.

16. The storage device according to claim 10, further comprising a failure determining unit that determines a possibility of an occurrence of a failure of the head based on the number of times of the abnormal floats of the head counted by the counting unit.

17. The storage device according to claim 16, wherein the failure determining unit determines the possibility of an occurrence of a failure based on data of detection of the abnormal floats of the head recorded in a chronological sequence.

18. The storage device according to claim 16, further comprising an alert sending unit that sends an alert to a higher-level device when the failure determining unit determines that there is a possibility of an occurrence of a failure of the head.

19. A control method for controlling a storage device having an auto-gain-control function for controlling strength of an output signal from a head that reads data from a storage medium, the control method comprising:

determining whether the strength of the output signal controlled by the auto-gain-control function is within a predetermined range;

detecting an abnormal float of the head based on a determination made at the determining;

counting a number of times of the abnormal floats of the head detected at the detecting; and storing the number of times of the abnormal floats counted at the counting into a storage area of the storage device.

* * * * *